US012525819B2

(12) United States Patent
Luo

(10) Patent No.: US 12,525,819 B2
(45) Date of Patent: Jan. 13, 2026

(54) MAGNETIC SOLAR WIRELESS CHARGING ACCESSORY SYSTEM

(71) Applicant: Tempo Manufacturing LLC, Nantong (CN)

(72) Inventor: Xiong Luo, Nantong (CN)

(73) Assignee: Tempo Manufacturing LLC, Nantong (CN)

( * ) Notice: Subject to any disclaimer, the term of this patent is extended or adjusted under 35 U.S.C. 154(b) by 724 days.

(21) Appl. No.: 17/997,179

(22) PCT Filed: Aug. 12, 2020

(86) PCT No.: PCT/CN2020/108555
§ 371 (c)(1),
(2) Date: Oct. 26, 2022

(87) PCT Pub. No.: WO2021/217949
PCT Pub. Date: Nov. 4, 2021

(65) Prior Publication Data
US 2023/0198302 A1    Jun. 22, 2023

(30) Foreign Application Priority Data
Apr. 28, 2020   (CN) .......................... 202010347544.0

(51) Int. Cl.
*H02J 7/35*     (2006.01)
*H02J 50/00*    (2016.01)
*H02J 50/10*    (2016.01)
*H02S 40/38*    (2014.01)

(52) U.S. Cl.
CPC .............. *H02J 50/005* (2020.01); *H02J 7/35* (2013.01); *H02J 50/10* (2016.02); *H02S 40/38* (2014.12)

(58) Field of Classification Search
CPC .................................. H02J 50/005; H02J 7/35
See application file for complete search history.

(56) References Cited

U.S. PATENT DOCUMENTS

2015/0216274 A1*   8/2015   Akin ...................... A45B 23/00
29/434

* cited by examiner

*Primary Examiner* — Robert Grant
(74) *Attorney, Agent, or Firm* — Wang Law Firm, Inc.

(57) ABSTRACT

A magnetic solar wireless charging accessory system comprises a solar wireless charging base and a wireless electrical equipment assembly, the solar wireless charging base comprises a base body, a battery module, a solar panel electrically connected to the input end of the battery module and a wireless transmitting coil electrically connected to the battery module; the wireless electrical equipment assembly comprises a housing, a wireless receiving coil, an electricity storage unit, an electrical equipment and a switch; the battery module provides electricity to the electricity storage unit through the wireless transmitting coil and the wireless receiving coil; the solar wireless charging base is positioned with the housing through a magnet. The invention has simple and reasonable structure, realizes wireless charging, it is flexible and convenient and can be applied to outdoor multiple scenes such as umbrella, sunshade fabric blind or awning.

9 Claims, 5 Drawing Sheets

MAGNETIC SOLAR WIRELESS CHARGING ACCESSORY SYSTEM

TECHNICAL FIELD OF THE INVENTION

The invention relates to a wireless charging accessory, in particular to a magnetic solar wireless charging accessory system.

BACKGROUND OF THE INVENTION

As an outdoor leisure appliance, umbrella is widely used in square, beach, park, courtyard and other leisure places, providing people with comfortable cool space. The existing umbrellas on the market only have the function of sunshade and rain proofing, and the function is relatively simple. At present, there are umbrellas with lighting and sound. At present, the umbrella lamp is usually fixed in the nest, rods, frame and other places, and it is not convenient to disassemble after installation and fixation. Therefore, it has the defects of fixed application place and single function form, and cannot be used flexibly.

After searching, a Chinese patent CN206922491U (patent No.: CN201720181734.3) disclosed "an umbrella" is found. The umbrella comprises a canopy, a column and a cap. The canopy is disposed between the column and the cap. The column has a frame for supporting the canopy. The frame is hinged with the column. The canopy is provided with a flexible thin-film solar panel, and the column is provided with a charging device and a lighting device, The output end of the flexible thin film solar panel is connected with the input end of the charging device, the output end of the charging device is connected with the lighting device, and the electrical device is also provided with a connection end for charging the electronic device. The sunshade has solar energy and lighting functions, but its lighting device is fixed on the column, but the connection structure is complex and cannot be easily disassembled.

Therefore, it is necessary to design a convenient accessory system, so that lights, audio and other equipment can be installed conveniently and used flexibly.

SUMMARY OF THE INVENTION

It is an object of the present invention to provide a magnetic solar wireless charging accessory system with simple and reasonable structure, flexible and convenient installation, which can adapt to a variety of application scenarios, especially the outdoor appliance of sun blind and umbrella lamp.

For achieving the above object, the magnetic solar wireless charging accessory system comprises a solar wireless charging base and a wireless electrical equipment assembly; wherein, the solar wireless charging base comprises a base body having a top and a bottom, a solar panel capturing solar energy and transforming solar energy into electric energy located on the top of the base body, a battery module having an input end located inside the base body, a wireless transmitting coil located at the bottom of the base body; the solar panel is electrically connected to the input end of the battery module; the wireless transmitting coil is electrically connected to the battery module; the wireless electrical equipment assembly comprises a housing having a top, a wireless receiving coil located on the top of the housing receiving electricity from the wireless transmitting coil, an electricity storage unit storing the electricity received from the wireless receiving coil and an electrical equipment both located inside the housing, a switch on the housing; the wireless receiving coil, the electrical equipment and the switch are electrically connected to the electricity storage unit; the battery module inside the base body provides electricity to the electricity storage unit through the wireless transmitting coil and the wireless receiving coil under a wireless induction transmission manner; a magnet is disposed at the top of the housing and the solar wireless charging base is positioned with the housing through the magnet.

Preferably, the housing has a top opening and a bottom opening, and a top cover covers the top opening of the housing, the magnet is annular; the annular magnet, a PCB board, a thermal conductive silicone piece and an iron plate assembly for electromagnetic shielding are disposed inside the housing and under the top cover of the housing in sequence; the wireless receiving coil is disposed on the PCB board and the magnet surrounds the wireless receiving coil.

Preferably, a battery compartment for receiving the electricity storage unit is disposed inside the housing and under the iron plate assembly.

Preferably, the electrical equipment comprises a lighting component and an audio component; the lighting component comprises a lighting PCB with a plurality of illuminants and an annular lampshade under the lighting PCB; the lampshade is positioned at the bottom opening of the housing.

Preferably, the lighting PCB is a circular ring, the lampshade and the lighting PCB have a substantial same inner diameter center hole for receiving the audio component.

Preferably, the audio component comprises an audio housing in plate, an audio circuit board and a speaker both inside the audio housing, and a sound transmission cover; the size of the audio housing is fitted with the center hole of the lampshade and the lighting PCB, and the audio housing is positioned in the center hole of the lampshade and the lighting PCB; the audio housing has a lower opening, the sound transmission cover covers the lower opening of the audio housing.

Preferably, the electrical equipment is not limited to the lighting component and the audio component, it also can be a mosquito killer, a sprayer or an aromatherapy device.

Preferably, the housing has a mounting hole at the periphery of the housing for mounting the control switch; a first type-C interface is disposed at the periphery of the housing and below the control switch.

Preferably, an iron ring is disposed at the bottom of the base body and surrounds the wireless transmitting coil; a lower cover is disposed at the bottom of the base body, a second type-C interface is disposed at the periphery of the base body. When in use, the wireless electrical equipment assembly is disposed below the solar wireless charging base, and the two are fixed by the magnetic.

Finally, the solar wireless charging base and the wireless electrical equipment assembly are positioned on a front surface and a back surface of a thin non-metallic material layer of a sunshade, a sun-umbrella or an awning through magnetic suction.

Compared with the prior art, the invention has the following advantages: it is divided into two parts: a solar wireless charging base and a wireless electrical equipment assembly, such as a lighting component and an audio component, which can be connected by a magnetic, fixed firmly, flexible and convenient to use; The lower end of the solar wireless charging base has a wireless transmitting coil, and the upper end of the wireless electrical equipment assemblies (such as the lighting and audio components) has a wireless receiving coil. The solar panel power generation will store the power in the battery modules, and charge the electricity storage unit of the wireless electrical equipment assemblies through the thin non-metallic material through the wireless induction charging technology, which is efficient for the use of electrical equipment such as lights, audio and other accessories. The invention has simple and reasonable structure, can realize wireless charging of two electronic components, fixed by magnetic suction, it is flexible and convenient, and can be applied to outdoor multiple scenes such as umbrella, sunshade fabric blind or awning.

DETAILED DESCRIPTION OF THE INVENTION

The present invention will be described in further detail with reference to the following embodiments.

Figure 1:
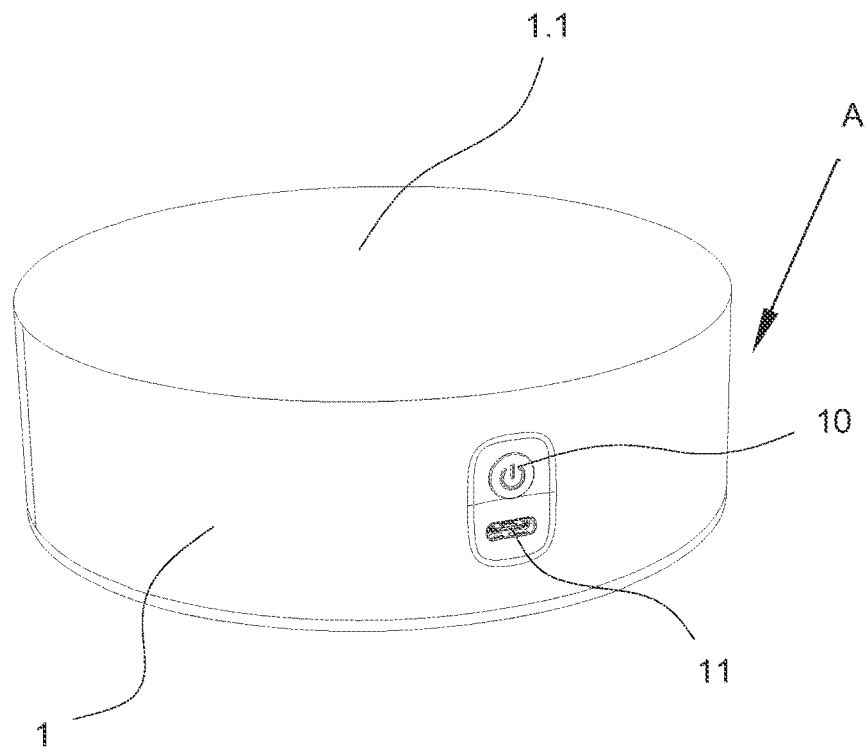
FIG. 1 is a perspective view of a wireless electrical equipment assembly according to an embodiment of the present invention.
Figure 2:
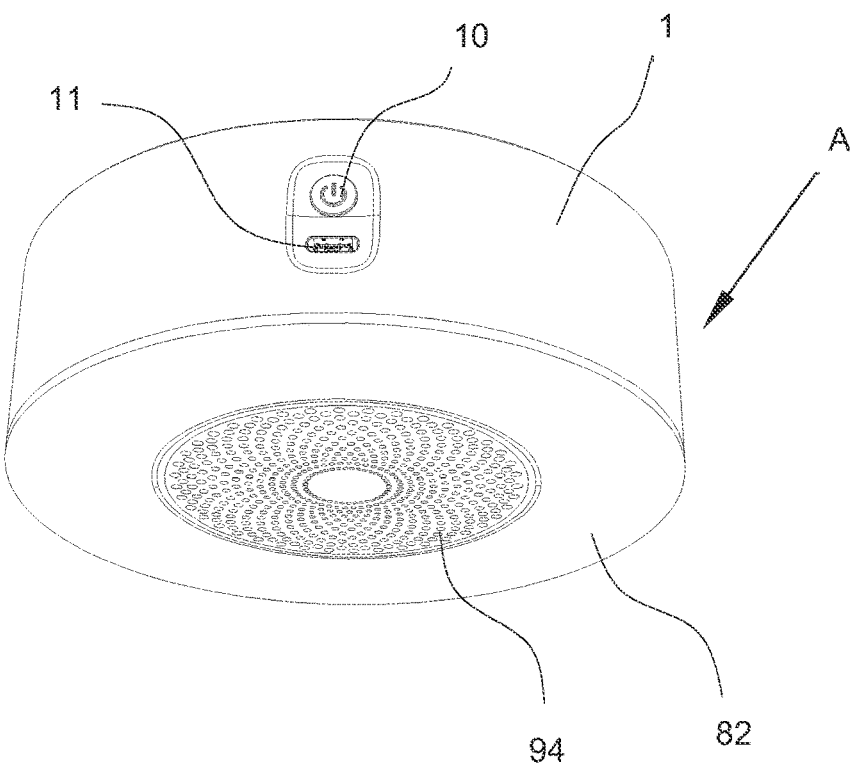
FIG. 2 is a bottom view of FIG. 1.
Figure 3:
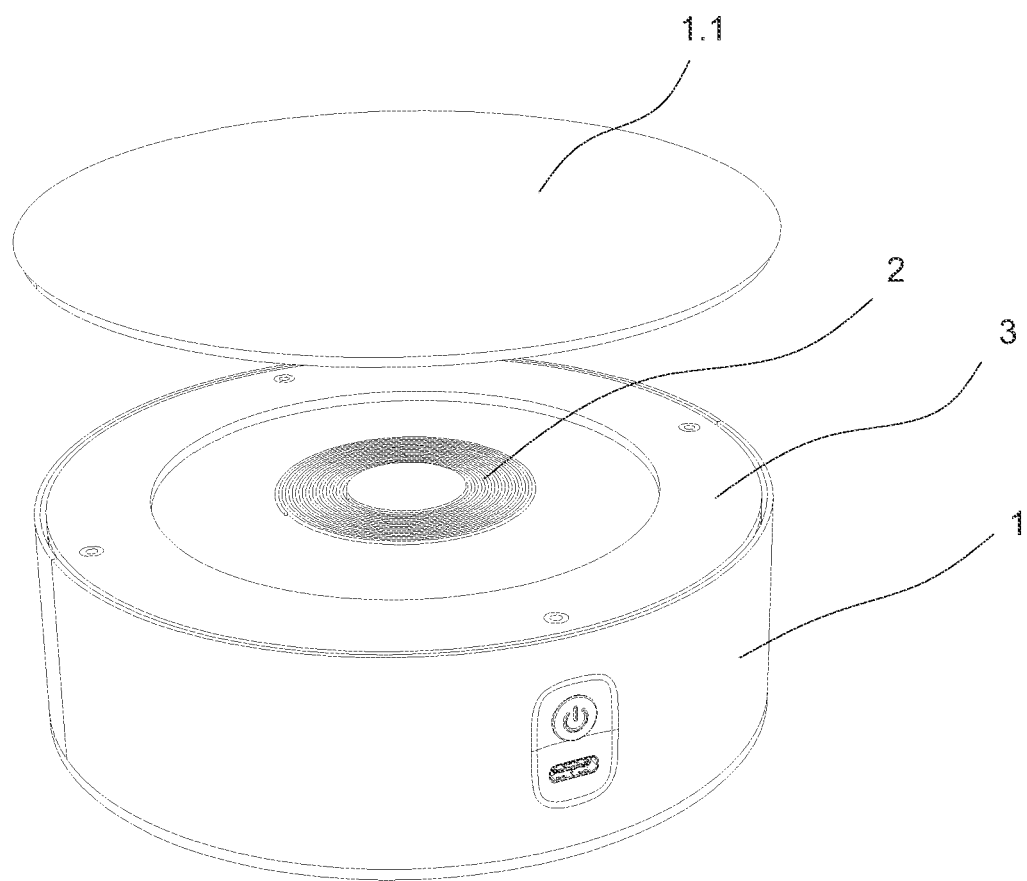
FIG. 3 is an exploded view of FIG. 1.
Figure 4:
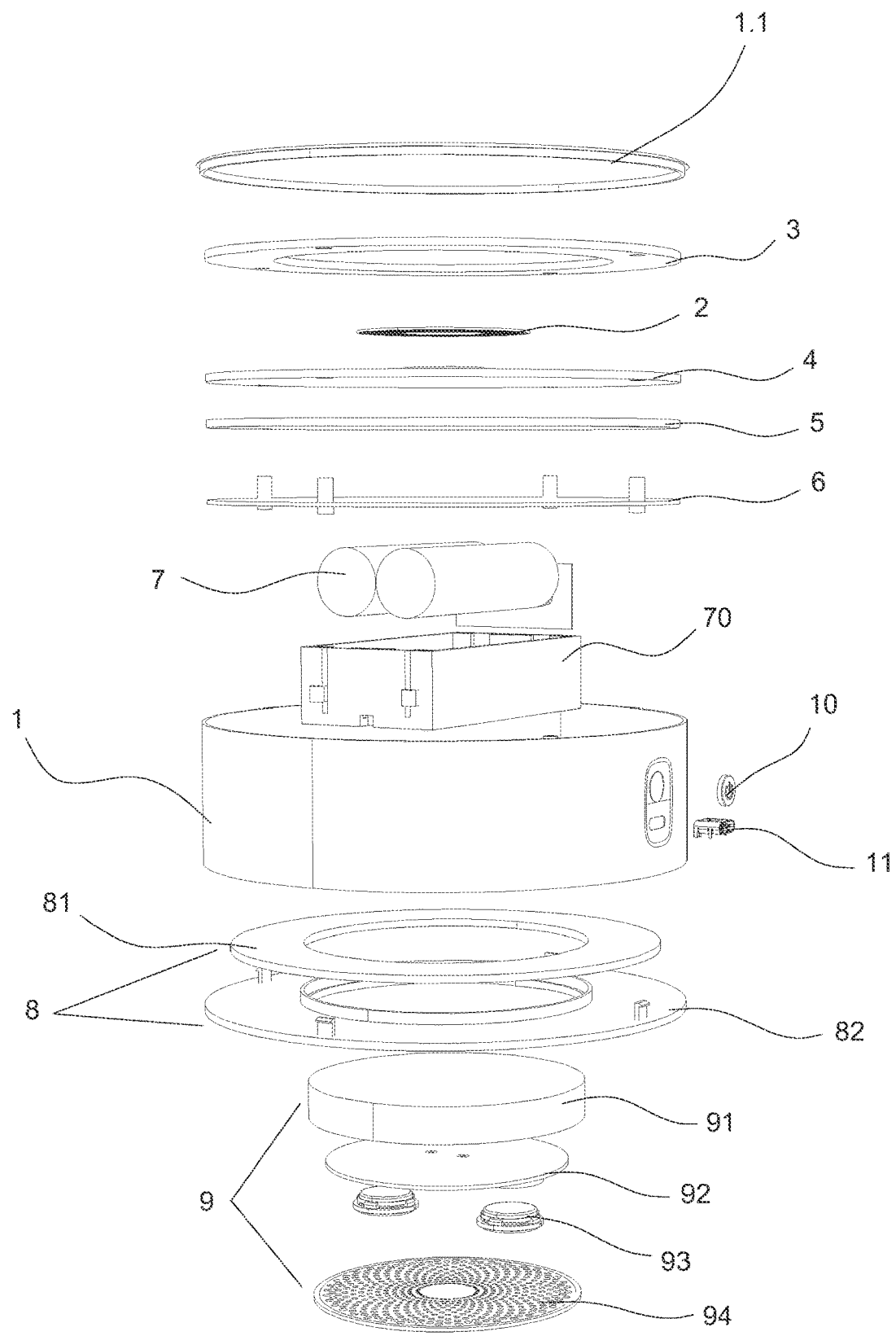
FIG. 4 is a further exploded view of FIG. 3.
Figure 5:
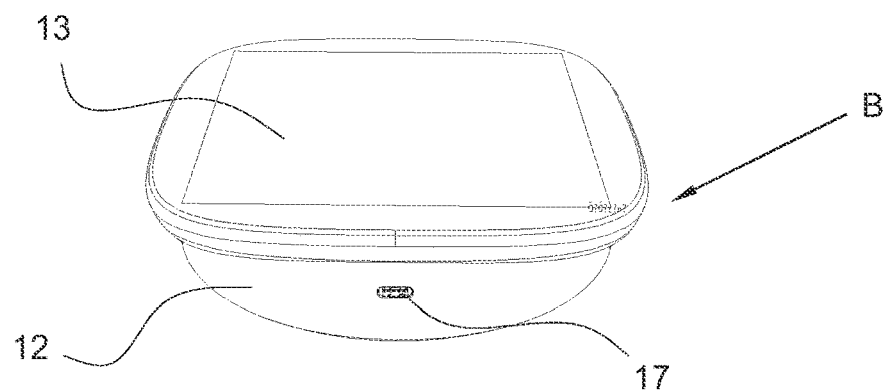
FIG. 5 is a perspective view of a solar wireless charging base according to the embodiment of the present invention.
Figure 6:
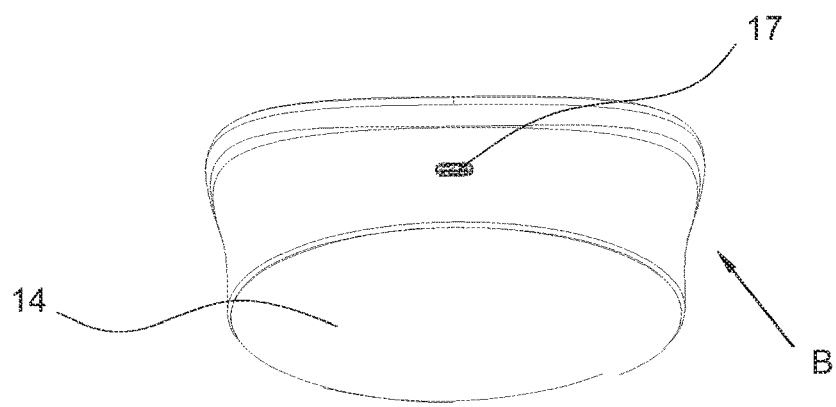
FIG. 6 is a bottom view of FIG. 5.
Figure 7:
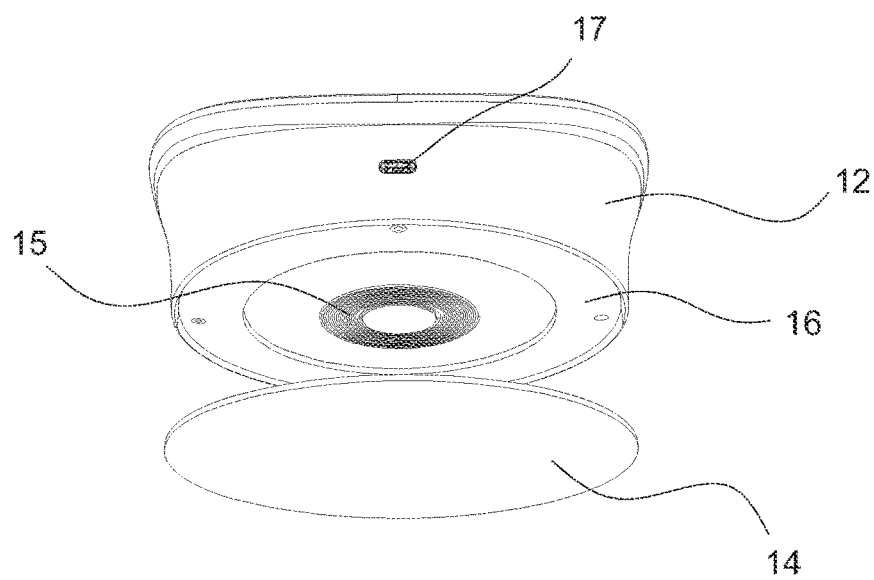
FIG. 7 is an exploded view of FIG. 6.
Figure 8:
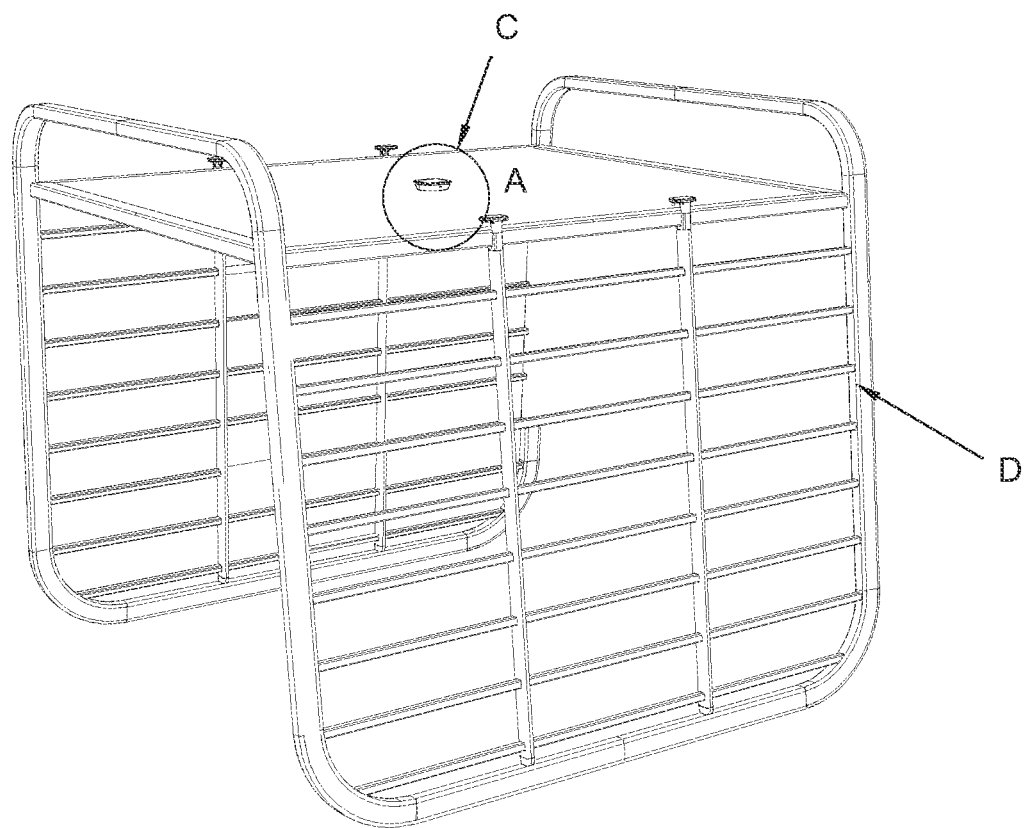
FIG. 8 is a perspective view of a magnetic solar wireless charging accessory system disposed on a sunshade according to the embodiment of the present invention.
Figure 9:
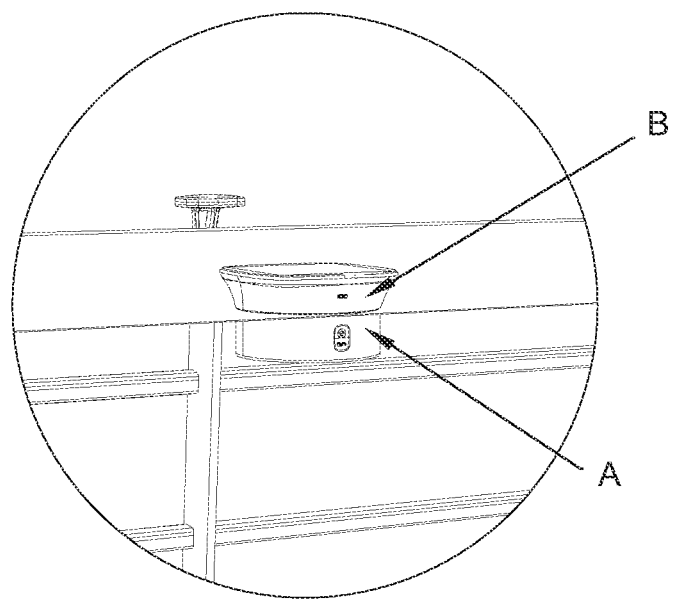
FIG. 9 is an enlarged view of Part-A in FIG. 8.

FIG. 1-9 show an embodiment of the magnetic solar wireless charging accessory system of the present invention. The magnetic solar wireless charging accessory system comprises a solar wireless charging base B and a wireless electrical equipment assembly A. Wherein, the solar wireless charging base B comprises a base body 12 having a top and a bottom, a solar panel 13 capturing solar energy and transforming solar energy into electric energy located on the top of the base body 12, a battery module having an input end located inside the base body 12, an iron ring 16 and a wireless transmitting coil 15 located at the bottom of the base body 12; the solar panel 13 is electrically connected to the input end of the battery module. The iron ring 16 surrounds the wireless transmitting coil 15; a lower cover 14 is disposed at the bottom of the base body 12, a second type-C interface 17 is disposed at the periphery of the base body 12. Generally, the solar panel 13, the second type-C interface 17 and the battery module are connected together through a circuit board to form a solar charging circuit, while the wireless transmitting coil 15 is connected to the battery module through the circuit board to form a wireless transmitting circuit. This is conventional technology.

The wireless electrical equipment assembly A comprises a housing 1 having a top, a wireless receiving coil 2 located on the top of the housing 1 receiving electricity from the wireless transmitting coil 15, an electricity storage unit 7 storing the electricity received from the wireless receiving coil 2 and an electrical equipment both located inside the housing 1; generally, the wireless receiving coil 2 is electrically connected to the electricity storage unit through a circuit board to form a wireless charging circuit. The solar panel 13 of the solar wireless charging base B stores the power in the battery module after generating power, The power is input into the electricity storage unit 7 of the wireless electrical equipment assembly A through the wireless induction charging technology. The housing 1 has a switch 10. The electricity storage unit 7 is electrically connected with the electrical equipment and the switch 10 to form a control loop. A magnet 3 is disposed at the top of the housing 1 and the solar wireless charging base B is positioned with the housing 1 through the magnet 3. When in use, the wireless electrical equipment assembly A is disposed under the solar wireless charging base B, and the two are fixed by magnetic suction.

The specific structure is as follows: the housing 1 has a top opening and a bottom opening, and a top cover 1.1 covers the top opening of the housing 1, the magnet 3 is annular; the annular magnet 3, a PCB board 4, a thermal conductive silicone piece 5 and an iron plate assembly 6 for electromagnetic shielding are disposed inside the housing 1 and under the top cover 1.1 of the housing 1 in sequence; the wireless receiving coil 2 is disposed on the PCB board 4 and the magnet 3 surrounds the wireless receiving coil 2, a battery compartment 70 for receiving the electricity storage unit 7 is disposed inside the housing 1 and under the iron plate assembly 6. The wireless receiving coil 2 is connected with the electricity storage unit 7 through the PCB board 4 to form a wireless charging circuit. The electrical equipment of this embodiment comprises a lighting component 8 and an audio component 9; the lighting component 8 comprises a lighting PCB 81 with a plurality of illuminants and an annular lampshade 82 under the lighting PCB 81; the lampshade 82 is positioned at the bottom opening of the housing 1. The lighting PCB 81 is a circular ring, the lampshade 82 and the lighting PCB 81 have a substantial same inner diameter center hole for receiving the audio component 9. The audio component 9 comprises an audio housing 91 in plate, an audio circuit board 92 and a speaker 93 both inside the audio housing 91, and a sound transmission cover 94; the size of the audio housing 91 is fitted with the center hole of the lampshade 82 and the lighting PCB 81, and the audio housing 91 is positioned in the center hole of the lampshade 82 and the lighting PCB 81; the audio housing 91 has a lower opening, the sound transmission cover 94 covers the lower opening of the audio housing 91. The housing 1 has a mounting hole at the periphery of the housing 1 for mounting the control switch 10; a first type-C interface 11 is disposed at the periphery of the housing 1 and below the control switch 10, which can facilitate the charging of electronic equipment such as mobile phones.

The electrical equipment is not limited to the lighting component 8 and the audio component 9, but also can be a mosquito killer, a sprayer or an aromatherapy device.

When in use, the solar wireless charging base B is disposed on the top surface of the sunshade D, and the wireless electrical equipment assembly A is disposed on the lower end surface of the top of the sunshade D, which is directly below the solar wireless charging base B. the two are fixed by magnetic suction. The solar panel 13 converts solar energy into electric energy, and stores the electric energy in the battery module, through the wireless induction charging technology, the electricity storage unit 7 in the wireless electrical equipment assembly A is charged through the thin non-metallic material layer (such as a canopy, a tarpaulin, a cord cloth, etc.), and then used for lights and audio accessories.

The scene can also be used for outdoor appliances such as sunshades, umbrellas or awnings.

The protection scope of the present invention is not limited to each embodiments described in this description. Any changes and replacements made on the basis of the scope of the present invention patent and of the description shall be included in the scope of the present invention patent.

The invention claimed is:

1. A magnetic solar wireless charging accessory system, comprising a solar wireless charging base and a wireless electrical equipment assembly;

wherein, the solar wireless charging base comprises a base body having a top and a bottom, a solar panel capturing solar energy and transforming solar energy into electric energy located on the top of the base body, a battery module having an input end located inside the base body, a wireless transmitting coil located at the bottom of the base body;

the solar panel is electrically connected to the input end of the battery module;

the wireless transmitting coil is electrically connected to the battery module;

the wireless electrical equipment assembly comprises a housing having a top, a top opening, a top cover covering the top opening, a bottom opening, and a wireless receiving coil located on the top of the housing receiving electricity from the wireless transmitting coil, an electricity storage unit storing the electricity received from the wireless receiving coil and an electrical equipment both located inside the housing, a switch on the housing;

the wireless receiving coil, the electrical equipment and the switch are electrically connected to the electricity storage unit;

the battery module inside the base body provides electricity to the electricity storage unit through the wireless transmitting coil and the wireless receiving coil under a wireless induction transmission manner;

a magnet is disposed at the top of the housing and the solar wireless charging base is positioned with the housing through the magnet, the magnet is annular;

the annular magnet, a PCB board, a thermal conductive silicone piece and an iron plate assembly for electromagnetic shielding are disposed inside the housing and under the top cover of the housing in sequence;

the wireless receiving coil is disposed on the PCB board and the magnet surrounds the wireless receiving coil.

2. The wireless charging accessory system of claim 1, wherein a battery compartment for receiving the electricity storage unit is disposed inside the housing and under the iron plate assembly.

3. The wireless charging accessory system of claim 2, wherein the electrical equipment comprises a lighting component and an audio component;

the lighting component comprises a lighting PCB with a plurality of illuminants and an annular lampshade under the lighting PCB;

the lampshade is positioned at the bottom opening of the housing.

4. The wireless charging accessory system of claim 3, wherein the lighting PCB is a circular ring, the lampshade and the lighting PCB have a substantial same inner diameter center hole for receiving the audio component.

5. The wireless charging accessory system of claim 4, wherein the audio component comprises an audio housing in plate, an audio circuit board and a speaker both inside the audio housing, and a sound transmission cover;

the size of the audio housing is fitted with the center hole of the lampshade and the lighting PCB, and the audio housing is positioned in the center hole of the lampshade and the lighting PCB;

the audio housing has a lower opening, the sound transmission cover covers the lower opening of the audio housing.

6. The wireless charging accessory system of claim 1, wherein the electrical equipment is a mosquito killer, a sprayer or an aromatherapy device.

7. The wireless charging accessory system of claim 1, wherein the housing has a mounting hole at the periphery of the housing for mounting the control switch;

a first type-C interface is disposed at the periphery of the housing and below the control switch.

8. The wireless charging accessory system of claim 1, wherein an iron ring is disposed at the bottom of the base body and surrounds the wireless transmitting coil;

a lower cover is disposed at the bottom of the base body, a second type-C interface is disposed at the periphery of the base body.

9. The wireless charging accessory system of claim 1, wherein the solar wireless charging base and the wireless electrical equipment assembly are positioned on a front surface and a back surface of a thin non-metallic material layer of a sunshade, a sun-umbrella or an awning through magnetic suction.

* * * * *